(12) United States Patent
Li

(10) Patent No.: US 11,978,020 B2
(45) Date of Patent: *May 7, 2024

(54) EMAIL SECURITY ANALYSIS

(71) Applicant: MICROSOFT TECHNOLOGY LICENSING, LLC, Redmond, WA (US)

(72) Inventor: Weisheng Li, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 339 days.

This patent is subject to a terminal disclaimer.

(21) Appl. No.: 17/344,002

(22) Filed: Jun. 10, 2021

(65) Prior Publication Data

US 2022/0172170 A1 Jun. 2, 2022

Related U.S. Application Data

(63) Continuation of application No. 16/290,474, filed on Mar. 1, 2019, now Pat. No. 11,055,669.

(51) Int. Cl.
*G06Q 10/107* (2023.01)
*G06F 16/93* (2019.01)
(Continued)

(52) U.S. Cl.
CPC ........... *G06Q 10/107* (2013.01); *G06F 16/93* (2019.01); *H04L 51/212* (2022.05);
(Continued)

(58) Field of Classification Search
CPC ......... G06Q 10/107; G06F 16/93; G06F 3/14; G06F 21/51; G06F 21/562; G06F 40/14; G06F 40/205; G06F 21/56; H04L 51/212; H04L 61/5007; H04L 63/02; H04L 63/0227; H04L 63/0245; H04L 63/14; H04L 67/52; H04L 51/18; H04L 63/0254;
(Continued)

(56) References Cited

U.S. PATENT DOCUMENTS 7,921,159 B1 * 4/2011 Cooley ................. H04L 51/212
382/165
8,819,142 B1 * 8/2014 Golub .................. H04L 51/212
709/206
(Continued)

*Primary Examiner* — Shaqueal D Wade-Wright
(74) *Attorney, Agent, or Firm* — Shook, Hardy & Bacon L.L.P.

(57) ABSTRACT

The technology described herein visibly depicts hidden message traits to help users determine whether an email is genuine or deceptive. The hidden message traits are revealed by identifying and changing attributes that keep the hidden traits from being displayed in a rendered message. Spam messages, phishing messages, and messages that include or link to malicious programs (e.g., malware, ransomware) are examples of unwanted messages that can harm a recipient. These messages often rely on deception to get past email filtering systems and to trick a user into acting on content in a message. The deception often involves including hidden traits in a message that fool an automated filtering system. The technology described herein shows the visible traits to a user by including them in the rendered version of the message.

20 Claims, 12 Drawing Sheets

(51) Int. Cl.
  *H04L 9/40*      (2022.01)
  *H04L 51/212*    (2022.01)
  *H04L 61/5007*   (2022.01)
  *H04L 67/52*     (2022.01)
  *H04W 12/128*    (2021.01)

(52) U.S. Cl.
  CPC .......... *H04L 61/5007* (2022.05); *H04L 63/02* (2013.01); *H04L 63/0227* (2013.01); *H04L 63/0245* (2013.01); *H04L 63/14* (2013.01); *H04L 67/52* (2022.05); *H04W 12/128* (2021.01)

(58) Field of Classification Search
  CPC .. H04L 63/16; H04W 12/128; G09G 2358/00
  See application file for complete search history.

(56) References Cited

U.S. PATENT DOCUMENTS

| | | | | |
|---|---|---|---|---|
| 2011/0126126 | A1* | 5/2011 | Blair | H04L 51/04 715/752 |
| 2013/0095889 | A1* | 4/2013 | Nguyen | H04W 4/48 455/557 |
| 2017/0264640 | A1* | 9/2017 | Narayanaswamy | G06F 16/285 |
| 2020/0334053 | A1* | 10/2020 | Wan | G06F 9/45558 |

* cited by examiner

212 — SENDER: OFFICE365 MJCROSOFT<NOTIFICATION@MICROSOFT.COM
RECIPIENT:
REPLY TO: ASL.DF@M
SUBJECT: ACTION NEEDED, PLEASE VERIFY YOU EMAIL ADDRESS

214 — THIS MAIL IS FROM A TRUSTED SENDER

216 — OFFICE 365

DEAR BOB,

OFFICE 365 HAS PREVENTED THE DELIVERY OF 9 NEW EMAILS TO YOU INBOX AS OF TUESDAY, SEPTEMBER 18, 2018 11:35 AM (UTC) BECAUSE IT IDENTIFIED THESE MESSAGES AS SPAM

YOU CAN REVIEW THESE HERE AND CHOOSE WHAT HAPPENS TO THEM.

218 — REVIEW MESSAGE

SENDER: OFFICE365 MJCROSOFT<NOTIFICATION@MICROSOFT.COM
RECIPIENT:
REPLY TO: ASL.DF@M
SUBJECT: ACTION NEEDED, PLEASE VERIFY YOU EMAIL ADDRESS

THIS MAIL IS FROM A TRUSTED SENDER

OF$^{42}$F$^{42}$ICE 3$^{42}$65

DEAR BOB,

OFF$^{42}$ICE 3$^{42}$65 HAS PREVE$^{42}$NTED THE DEL$^{42}$IV$^{42}$ERY OF 9 NE$^{42}$W EM$^{42}$AILS TO YOU INB$^{42}$OX AS OF TUESDAY, SEPTEMBER 18, 2018$^{42}$ 11:35 AM (UTC) BECAUSE IT IDENTIFIED THESE MESSAGES AS SPAM

YOU CAN REV$^{42}$IEW TH$^{42}$ESE HE$^{42}$RE AND CHO$^{42}$OSE WHAT HAPP$^{42}$ENS TO TH$^{42}$EM.

REVIEW MESSAGE

*FIG. 3*

IMPERSONATION REPORT:

1. KEYHIT    OFFICE
   PASSORDER 2
   INCLUDEDISTANCE  0
   LOOKALIKETYPE    PREFIX

2. KEYHIT    MICROSOFT
   PASSORDER 2
512 — LANGUAGESCRIPTMIXING  TRUE
   LOOKALIKETYPE    WEAKEQUAL

REPLY TO A DIFFERENT EMAIL ADDRESS THAN THE SENDER ADDRESS THAT IS IMPERSONATED
— 510

EMAIL CONTENT REPORT

712 — THE EMAIL CONTAINS A FAKE SECURITY TIP:

714 — THIS MAIL IS FROM A TRUSTED SENDER.

THE EMAIL CONTAINS MANY HIDDEN TEXTS, EXPOSED IN
716 — ORANGE COLOR HERE, BETWEEN WORDS

THE CONTENT IMPERSONATE OFFICE365.
    KEYHIT    OFFICE365
718 — PASSORDER 2
    INCLUDEDISTANCE   0

720 — THE CONETENT IMPRESONATE BRAND MICROSOFT, BUT IS NOT
FROM MICROSOFT.

812 — SENDER: REBE SCRANTON <FDCHARLOTTEFWC@OUTLOOK.COM>
RECIPIENT:
REPLY TO: SUBJECT: INFO -ME0OHM

816 — I DO KNOW ME0OHM IS YOUR PASS WORDS. LETS GET DIRECTLY TO THE POINT. NO-ONE HAS COMPENSATED ME TO INVESTIGATE YOU. YOU DO NOT KNOW ME AND YOU'RE MOST LIKELY WONDERING WHY YOU'RE GETTING THIS E MAIL?

EMAIL SECURITY ANALYSIS

CROSS REFERENCE TO RELATED APPLICATIONS

This application is a continuation of Ser. No. 16/290,474, filed Mar. 1, 2019, and entitled EMAIL SECURITY ANALYSIS, the entirety of which is hereby incorporated by reference.

BACKGROUND

Email is a widely used communication tool that provides a quick and inexpensive method of communication between individuals and group. Increasingly, spam emails, phishing emails, and emails that include or link to malicious programs (e.g., malware, ransomware) pose risks to users, companies, and computing devices. Efforts have been made to identify unwanted and/or malicious emails before the emails are received by a user using a filtering system. The filtering system may use natural language processing or other mechanisms to classify an email. At present, no email filtering system is perfect. Some benign emails are misclassified as spam, while other spam emails reach a user inbox. When an email is classified as benign, there is small chance the email is actually malicious. When an email is classified as malicious, there is a small chance that the email is actually benign. In an enterprise environment, some emails are quarantined, instead of delivering the email to a junk folder. The emails in a quarantine folder may be evaluated by administrators or others. However, this, often manual evaluation, is time consuming and error prone.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein visibly depicts hidden message traits to help users determine whether an email is genuine or deceptive. The hidden message traits are revealed by identifying and changing attributes (e.g., Cascading Style Sheets ("CSS") and HTML style tags) that keep the hidden traits from being displayed in a rendered message. Additional analysis, such as a link or virus analysis, may be provided to aide a user. Identifying hidden traits helps experts quickly determine that an email contains suspicious characteristics just by looking at the modified email. The technology can also help everyday users avoid falling victim to a scam. Overtime, use of the technology described herein can educate users by helping them identify hidden characteristics of emails that should be avoided.

Electronic messages or documents, including short message service (SMS), multimedia messaging Service (MMS), Instant messaging (IM), emails, social networking messages, webpages, or even ordinary electronic documents are all vulnerable to manipulation that can allows the messages to harm a recipient. Spam messages, phishing messages, and messages that include or link to malicious programs (e.g., malware, ransomware) are examples of unwanted messages that can harm a recipient. These messages often rely on deception to get past email filtering systems and to trick a user into acting on content in a message. The deception often involves including hidden traits in a message that fool an automated filtering system. If these hidden traits were visible to a user, then the deceptive nature of the message would be apparent. The technology described herein shows the visible traits to a user by including them in the rendered version of the message.

BRIEF DESCRIPTION OF THE DRAWINGS

Aspects of the invention are described in detail below with reference to the attached drawing figures, wherein:

FIG. 2 is a diagram showing a message as it appears with hidden content hidden, according to an aspect of the technology described herein;

FIG. 3 is a diagram showing a message as it appears with hidden content visible, according to an aspect of the technology described herein; according to an aspect of the technology described herein;

FIG. 5 is a diagram showing an impersonation report, according to an aspect of the technology described herein;

FIG. 7 is a diagram showing an email content report, according to an aspect of the technology described herein;

FIG. 8 is a diagram showing a message as it appears with hidden content visible, according to an aspect of the technology described herein; according to an aspect of the technology described herein;

DETAILED DESCRIPTION

Figure 1:
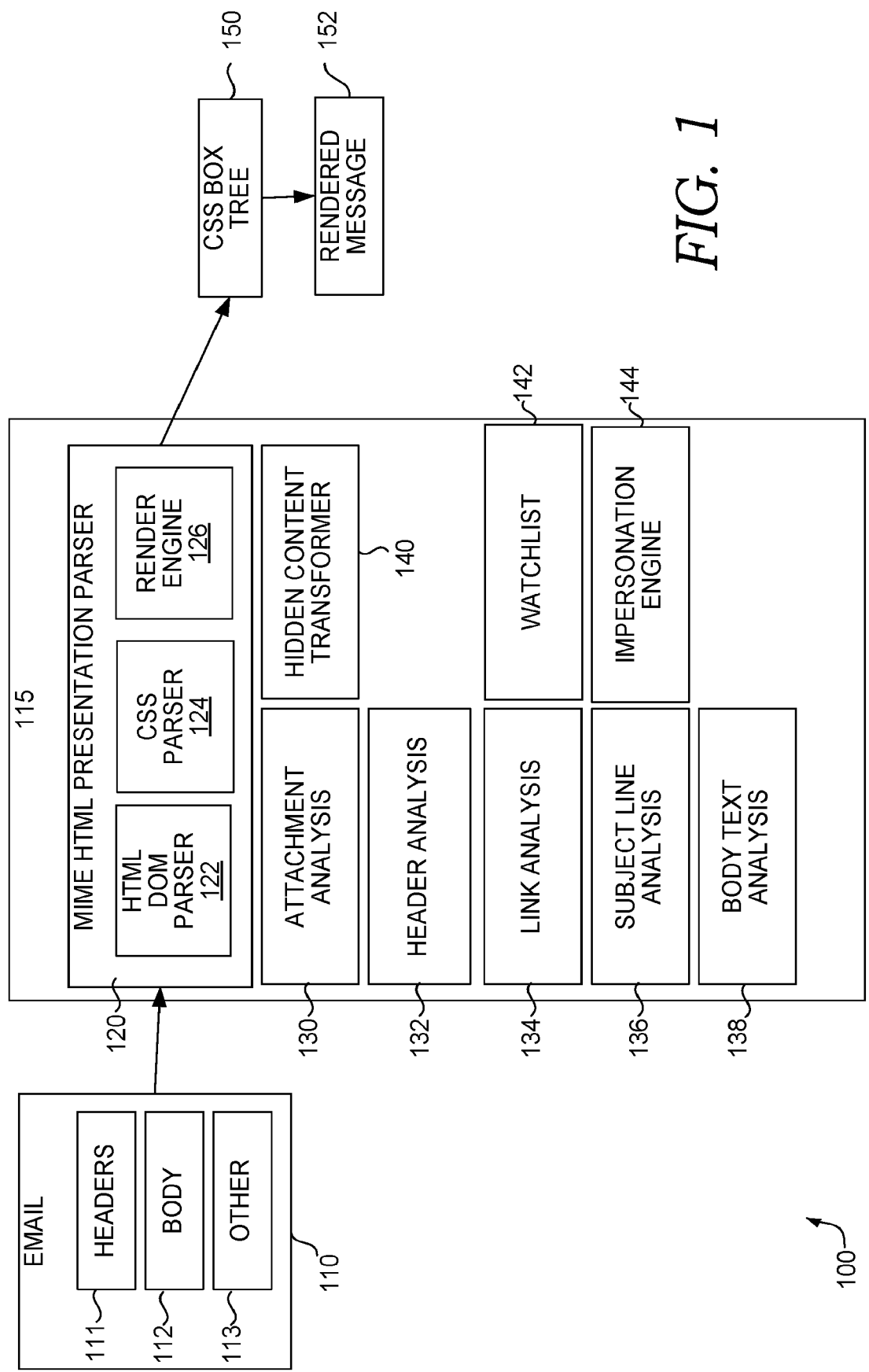
FIG. 1 is a block diagram of an example operating environment suitable for implementing aspects of the technology.

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein visibly depicts hidden message traits to help users determine whether an email is genuine or deceptive. The hidden message traits are revealed by identifying and changing attributes (e.g., Cascading Style Sheets ("CSS") and HTML style tags) that keep the hidden traits from being displayed in a rendered message. Additional analysis, such as a link or virus analysis, may be provided to expose additional hidden traits. Identifying hidden traits helps experts quickly determine that an email contains suspicious characteristics just by looking at the modified email. The technology can also help everyday users avoid falling victim to a scam. Overtime, use of the technology described herein can educate users by helping them identify hidden characteristics of emails that should be avoided.

Electronic messages or documents, including short message service (SMS), multimedia messaging Service (MMS), Instant messaging (IM), emails, social networking messages, webpages, or even ordinary electronic documents are all vulnerable to manipulation that can allows the messages to harm a recipient. Spam messages, phishing messages, and messages that include or link to malicious programs (e.g., malware, ransomware) are examples of unwanted messages that can harm a recipient. These messages often rely on deception to get past email filtering systems and to trick a user into acting on content in a message. The deception often involves including hidden traits in message coding that fool an automated filtering system. If these hidden traits were visible to a user, then the deceptive nature of the message would be apparent. The technology described herein shows the hidden traits to a user by including them in the rendered version of the message.

The hidden traits include hidden content. To prevent detection by a filtering system, senders can alter the message coding to include content (e.g., words, letters, symbols) in the body text, subject line text, link descriptions, email addresses, and other portions that are not visible to the user when rendered, but fools the filtering system. For example, some filters look at keywords or word strings within message content to classify a message as spam. Senders disguise these words or strings from the filter by including words or characters in between letters of a word to prevent the filter from identifying the word in the message content. Styles are used to make these extra symbols or words invisible to the user, so the rendered message text appears to be normal to the user. The present technology identifies hidden content within message coding and changes the styles associated with the hidden content to make the hidden content visible to the user. The hidden content can also be displayed with a visible characteristics that indicates it was previously hidden. For example, the hidden content could be displayed with a strikethrough line, in a different color than other text, in a different font than other text, a different font size, and the like.

The hidden traits can also include deceptive links and attachments. These hidden traits can be exposed by presenting a link analysis or document analysis to the user.

The technology described herein may be applied automatically to emails in a junk folder or quarantine folder. Alternatively, a "Show Hidden Trait" button may trigger the hidden trait view. The hidden trait button could activate a hidden trait view for an entire message or just a portion. For example, an email message may have a different button associated with the message body, subject line, address line(s), etc.

A message comprises message coding. The message coding includes message content and style instructions. Rendering the message coding results in rendered content. Rendered content is content that appears to the when a message is output for display. The message coding can include style instructions that are not rendered, but define how the message content appears when rendered. The message content includes text or images that could be visible to a user if associated with appropriate style instructions when rendered. Hidden content is message content (e.g., text, image) that is associated with a style instruction that obscures its visibility to a user when rendered. Obscured visibility occurs when a text color matches or nearly matches a background color, when a text font is more than a threshold percentage smaller than adjacent text, when a text font is below a threshold size, or the like. The style instructions are not hidden content because they are not intended to appear within the rendered content. Hidden content is one characteristic of a hidden trait within a message.

Having briefly described an overview of aspects of the technology described herein, an exemplary operating environment in which aspects of the technology described herein may be implemented is described below. Turning now to FIG. 1, a block diagram is provided showing an operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects functionality of these components can be shared or distributed across other components.

Among other components not shown, operating environment 100 includes a hidden-trait exposure system 115 that receives a message, such as email 110, analyses the message to identify hidden traits, and generates a CSS Box tree 150 with altered message coding that causes hidden traits to be visible within a rendered message 151. It should be understood that operating environment 100 shown in FIG. 1 is an example of one suitable operating environment. Each of the systems shown in FIG. 1 may be implemented via any type of computing device, such as computing device 1200 described in connection to FIG. 12, for example. These components may communicate with each other via a network, which may include, without limitation, a local area network (LAN) and/or a wide area network (WAN). In exemplary implementations, WANs include the Internet and/or a cellular network, amongst any of a variety of possible public and/or private networks.

The email 110 is one type of message that can be analyzed by the hidden-trait exposure system 115. Aspects of the technology described herein are not limited to use with emails. The hidden-trait exposure system 115 could analyze short message service (SMS) messages, multimedia messaging Service (MMS) messages, Instant messaging (IM) messages, emails, social networking messages, webpages, ordinary electronic documents, and the like. While not limited to use with the email, email will be used throughout the description of FIGS. 1-8 as an exemplary message where hidden traits can be exposed by the technology described herein.

The email 110 includes a header 111, body 112, and other content 113. The header 111 comprises routing information for the email 110. The routing information can include the sender, recipient, date and subject. The header includes KEY:VALUE pairs. Some of the mostly commonly used KEY:VALUE pairs includes, the from, to, cc, bcc, date, and subject headers. The header information also includes routing information for the email. Routing information can include the sending time stamps and the receiving time stamps of all mail transfer agents (MTA) that have received and sent the message. In other words, any time a message is transferred from one user to another (e.g., when it is sent or forwarded), the message is date/time stamped by a MTA. Some of the header information may be displayed to a user by an email program. Different email clients may choose to display KEY fields and/or different values within the field. For example, the "from" and "subject" fields are commonly displayed.

The email body 112 is the main part of an email message. It contains the message's text and images. The email's body is distinct from its header 111, as used herein, though some email standards may not distinguish between a body and header. Messages can contain multiple versions of the same text, with Hyper Text Markup Language (HTML) formatting and without—for instance. In one aspect, the body is encoded per Multipurpose Internet Mail Extensions (MIME) type standard.

The other content 113 can include attachments or other content not included within the header 111 or body 112. Attachments can include files of different types, including image, audio, documents, spreadsheets, presentations, etc.

The hidden-trait exposure system 115 identifies hidden traits in a message and displays the hidden traits to a user. The hidden-trait exposure system 115 comprises MIME HTML presentation parser 120, an attachment analysis component 130, header analysis component 132, link analysis component 134, subject-line analysis component 136, body-text analysis component 138, hidden-content transformer 140, watch list 142, and impersonation engine 144. The hidden-trait exposure system 115 generates a CSS box tree 150 which can be processed by a computing device to generate a rendered message 152.

The MIME HTML presentation parser 120 receives the email 110 and generates the CSS box tree 150. The CSS box tree 150 comprises a series of CSS boxes. Each CSS box can have display size characteristics and comprise a content element, such as text. Each CSS box can have a CSS display style that controls how the text, or other content element is displayed. The presentation parser 120 calls on other components of the hidden-trait exposure system 115 to show hidden traits of the email 110 so that the hidden traits are visible within the rendered message 152. The presentation parser 120 includes an HTML DOM (Document Object Model) parser 122, a CSS parser 124, and render engine 126.

The HTML DOM parser 122 reads the HTML code of email 110 and builds the DOM. The DOM is a tree structure where each node in the structure is an object representing a part of the email content. Each branch of the tree ends in a node, and each node contains objects. DOM methods allow programmatic access to the tree; with them one can change the structure, style or content of an email. In particular, the CSS parser 124 and render engine 126 may modify the DOM. The HTML coding in the email may include the email header and body text. In some emails, the HTML of the email may include style instructions for the body text, however, CSS is more commonly used to assign style instructions. The HTML DOM parser 122 may send body text, header text, and styles to other components, such as the hidden-content transformer 140 for analysis.

CSS parser 124 parses CSS styles within the email 110. The CSS styles may be inline, imbedded or linked. The CSS styles within the email are one example of style instructions. The CSS styles are associated with CSS boxes.

The render engine 126 may execute Java code associated with the email 110. The Java code may change the CSS styles associated with different elements by changing a style associated with individual CSS boxes. Once the HTML DOM parser 122, CSS parser 124, and a render engine 126 have complete their tasks a preliminary CSS box tree (not shown) is built. The preliminary CSS box tree does not show hidden content, if any exits in the message. The preliminary CSS box tree includes CSS boxes with styles specified by the email sender. In one aspect, the preliminary CSS box tree is built to fully evaluate the email 110 for hidden traits. For example, because the CSS styles associated with different elements might change through the parsing process, it is desirable to fully parse the message and then evaluate the result for hidden traits. The preliminary CSS box tree is processed by one or more other components in the system to identify hidden traits and generate the CSS box tree 150, which will display identified hidden traits. Additionally, other hidden traits may be displayed in reports displayed with the message in an interface generated separately from the CSS box tree 150. Thus, hidden traits may be displayed by modifying the styles associated with CSS boxes or in separate reports.

The attachment analysis component 130 analyzes files attached to the message for hidden traits, such as viruses. The attachment analysis may comprise conducting a virus scan of an attached file and then presenting the results of the scan in a report. The report can warn of a virus or indicate that no virus was found.

The header analysis component 132 may identify suspicious character script mixing in headers and reveals it visually if present.

The header analysis component 132 may identify impersonation in the headers and reveal it visually if present. Impersonation occurs when the sender tries to fool a recipient into thinking the message is from an entity other than the sender. The header analysis component 132 may use the impersonation engine 144 to detect impersonation.

The header analysis component 132 may check the alignment of P1 address and P2 address and visually depicts any alignment concerns. Emails include both a P1 from address and P2 from address. The P1 address is what the email client and other computers use to route the email message. The P2 address is what is shown to the user in the "from" box on the email Ideally, the P2 address and P1 address should align. When they don't align, then the P1 address may be displayed with the P2 address with an explanation of misalignment. For example, if the P1 address is help@microsoft.com (possibly with additional IP address information) and the P2 address is help@microsoft.com then the P1 and P2 addresses align. If the P1 and P2 addresses differed by even a single letter then they would not align.

The header analysis component 132 may check the alignment of sender address and the reply-to address. The sender address and reply-to address may be designated separately within an email. As with the P1 and P2 addresses, misalignment may indicate a spam email. Any misalignment is displayed visually, for example, by displaying the reply-to address adjacent to the "from" address with an explanation.

The header analysis component 132 may check for sender address impersonation. The header analysis component 132 may use the impersonation engine 144 to detect sender impersonation.

The header analysis component 132 may reveal an email authentication status. Emails may be authenticated using several different methods, such as SPF (Sender Policy Framework), DKIM (DomainKeys Identified Mail), and Domain-based Message Authentication, Reporting & Conformance (DMARC). These email authentication standards supplement SMTP, the basic protocol used to send email, and most modern email systems support them.

The header analysis component 132 may reveal a senders client IP address (i.e., received from address) and displays it in a map showing the sender IP geolocation and reputation of the location, and reputation of the client IP address. The client IP is the IP address of the device that sent emails.

The header analysis component 132 may reveal the connecting IP addresses in the header and display a geolocation associated with the client IP address on a map. The map way show the sender's client IP geolocation and reputation of the location. The map can also show an indication of a reputation of IP. The connecting IP address is the last device IP linked to the receiving email server. The connecting IP addresses are associated with routing stops, such as mail servers, between the original from IP address and the recipient IP address. As mentioned, these could be fake. If a known sender sent email hops from IP locations that is different from the previous stable email sending path, it is highly suspicious. This hopping activity may be visually highlighted by showing IP address outside of the stable email sending path in a different color.

The header analysis component 132 may reveal if the sender is a known sender or unknown sender. Known senders can be in an address book for a user, in a company, or be an address the user has previously sent emails to. The header analysis component 132 reveals if the sender sent from new a client IP or a new connecting IP if it a known sender.

The header analysis component 132 may determine if an email is sent from a known domain. Different factors can be used to determine if a domain is known. A domain may be unknown if the inbox has not received emails from the domain before. A domain may be unknown if an entity, such as a corporation associated with an email address, has not received emails from the domain before. The header analysis component 132 can report if the email is sent from an unknown domain.

The link analysis component 134 analyzes links in a message for hidden traits.

The link analysis component 134 may compare a linked URL against multiple available URL blocking proxies to see if it is listed as bad URL. A warning message can be provided if the URL is on a block list. In addition to a warning, the shows link analysis component 134 may display a redirected URL, if any, and check the whois status to the redirected URL, and expose it visually.

The link analysis component 134 may check for impersonation in URL, and expose it visually. The link analysis component 134 may check a URL host's IP reputation, and expose it visually in a report or other indication. The link analysis component 134 may determine whether the URL aligns with the link text, if the link is in URL format, and expose it visually in a message.

The link analysis component 134 may display URL text so the user can notice any strange format, IDN (Internationalized Domain Name) tricks, and expose tricks or formatting issues visually.

The link analysis component 134 may apply URL machine learning prediction and shows the result. The machine learning can take several forms. In one aspect, a classification mechanism is used to determine whether a URL is safe. The machine learning can be trained using human labeled "safe" URLs and "unsafe" URLs.

The subject-line analysis component 136 analyzes the subject line for various characteristics that may indicate the email is spam. In one aspect, the subject-line analysis component 136 may perform a similarity analysis using natural language processing to determine whether the subject line content is similar to subject lines in previously identified spam emails. The subject-line analysis component 136 can also check impersonation with the impersonation engine 144. A notification can be provided warning the user that the subject line is similar to subject lines in spam emails.

The body-text analysis component 138 analyzes a message body for hidden traits that may suggest the email is spam. The body-text analysis component 138 may identify suspicious character script mixing, such as mixing Latin characters and Cyrillic characters, mixing letters from different languages, or different alphabet sets. The body-text analysis component 138 may reveal this script mixing by showing the Latin characters in one color and the Cyrillic characters in another.

The body-text analysis component 138 may check for impersonation and exposes it visually through a report. In one aspect, entities listed in the body text of a message that do not match an entity associated with the sender of the message are visually differentiated to highlight this difference.

The body-text analysis component 138 may check the content risk level by identifying requests known to be made by spammers, such as requesting a credential change, requesting a money transfer, requesting a ransom, asking the user to download files, requesting the user access an attachment, etc. A warning can be provided when the body-text includes text making these types of requests, especially when other threats are showing. The text containing the request could also be visually highlighted in a different color, font size, etc.

The body-text analysis component 138 can generate a report indicating how often similar content was observed in other emails. If the email contains content similar to the known bad emails, then the report can indicate email is bad. If the body content is similar to the benign bulk emails with different URL domains, then the report can indicate email is bad.

The body-text analysis component 138 may determine and report that text is actually an image. Spammers use images to display text because some spam filters may not analyze images. Text that may raise a red flag to a spam filter can avoid detection by the spam filter by being in an image. Any images in a message may be revealed by including a visible frame or border around the image.

The hidden-content transformer 140 identifies hidden text within message text and changes a style instruction associated with the hidden text to make the hidden text visible when the message is output for display. Hidden text is text that is not visible to the user when the message is output for display to the user. Text can be hidden in a number of different ways all of which may be identified by the hidden-content transformer 140. For example, text may be associated with a small or zero size font, the text color may match or be similar to the background color, the text may be occluded by an image, the text may be marked as not display with CSS, and the like. A similar color between the background and text may be determined by determining the color distance and comparing the color distance to a threshold. Similarly, a small font size maybe any font less than the designated threshold size.

Once hidden text is identified, a display characteristic of the text that renders it hidden is changed by the hidden-content transformer 140 to make the text visible. For example, the font size may be increased to a size similar to that of other text in the message. While the text size may match the size of nearby text, additional characteristics of the hidden text may be changed to indicate that it has been modified by the hidden-content transformer 140. For example, the transformed text may be displayed with a strikethrough, in a different color, in italics, in bold, highlighted with a different background color, or otherwise differentiated from other text that was not transformed.

The text may be transformed by associating the hidden text with a different style instruction. Style instructions can come in many forms. For example, style instructions for text can be provided by HTML attributes, CSS styles, and other means. The text may be transformed by replacing an original style instruction with a new style instruction that renders a text visible.

The impersonation engine 144 identifies message content (e.g., a substring in a suspicious string) that visually resemble a famous, well-known, or otherwise legitimate mark, person, institute, or entity ("known entity" hereinafter) listed in the watch list 142. Impersonation engine 144 can use rules and/or artificial intelligence methods to identify a message or message content that attempts to impersonate a famous entity. For example, the message may include content that purports to be from a known entity, but the "from" email address does not match to an email address known to be associated with the known entity. Impersonation engine 144 can include technology to identify known entities within message content despite efforts by senders to obscure the known entity within the message coding. For example, senders may insert, remove, or replace some characters of the known entity, e.g., replacing characters of the legitimate text with Unicode characters that appear visually similar to the original characters; prefixing, suffixing, including, or otherwise mixing the legitimate text with other characters; and/or mixing aforementioned impersonation methods. Substituting letters prevents the impersonation engine 144 from making a direct match to a known entity. However, the impersonation engine 144 may find those strings that resemble the known entity when rendered, but may have added, deleted, or replaced characters. For example, in the first pass, any strings include "Microsoft" may be found as instances of exact-inclusion. In the second pass, suspicious strings, such as "Microoooosoft", "M i crôsσ f tTeam", or "M-i-c-r-o-s-o-f-t" would be detected as instances of fuzzy-inclusion that can indicate impersonation.

When impersonation is detected, then the user may be notified of the suspected impersonation through a report as described elsewhere.

The operation of the hidden-trait exposure system 115 is illustrated in FIGS. 2-8. FIG. 2 shows an example message 200 without hidden features displayed. The message includes a header section 212, which includes a "to" line, a "from" line, a "cc" line, and a subject line. The safety analysis 214 indicates that the message is from a trusted source. The body text 216 explains that Office 365 has intercepted spam emails that can be reviewed by pressing the "review email" button 218. FIGS. 3-7 show additional interfaces that reveal hidden traits of message 200.

FIG. 3 shows the message 200 with hidden text shown in the updated body 316. As can be seen, the numbers one and two are inserted between words throughout the text in order to fool a spam filter. Previously, these numbers were hidden. The style associated with this hidden text was changed by hidden-trait exposure system 115 to make it visible. In this example, the hidden text is shown in a different color, yellow, the adjacent text, and is shown with a strikethrough to indicate that its visibility was caused by the hidden-trait exposure system 115.

Figure 4:
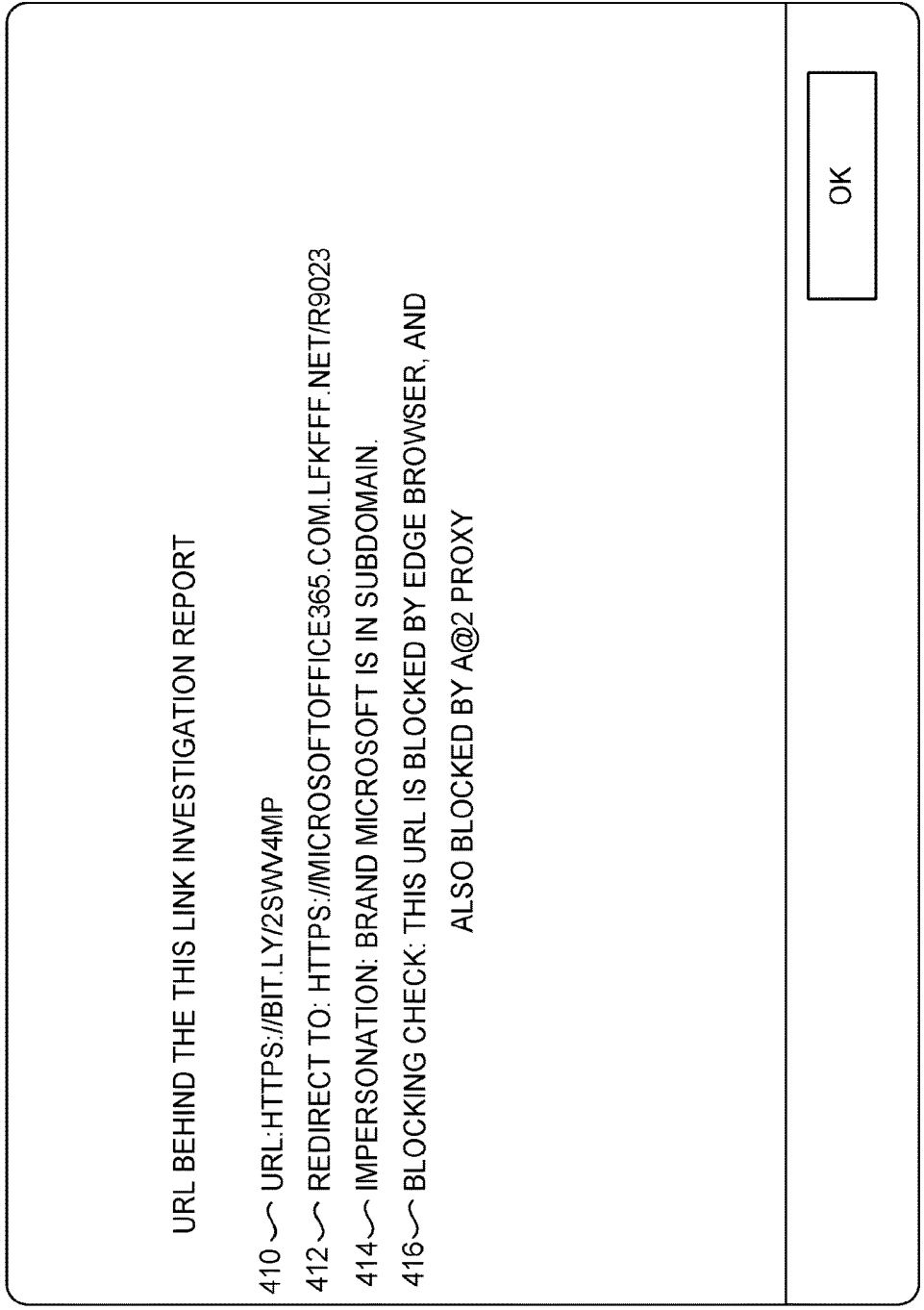
FIG. 4 is a diagram showing a URL inspection report, according to an aspect of the technology described herein.

FIG. 4 exposes hidden traits of the review button 218 through a URL inspection report 400. As can be seen, the URL inspection report 400 shows the linked URL 410 and a redirect URL 412 to which the user is redirected upon selecting the link URL 410. The inspection report 400 also provides impersonation guidance 414 and an indication that the URL is on one or more blacklists.

FIG. 5 shows an impersonation report 500, such as might be generated by the impersonation engine 144. The impersonation report shows that language script mixing is occurring 512 along with other aspects of the report. The summary 510 indicates that the reply email address is different from the sender address.

Figure 6:
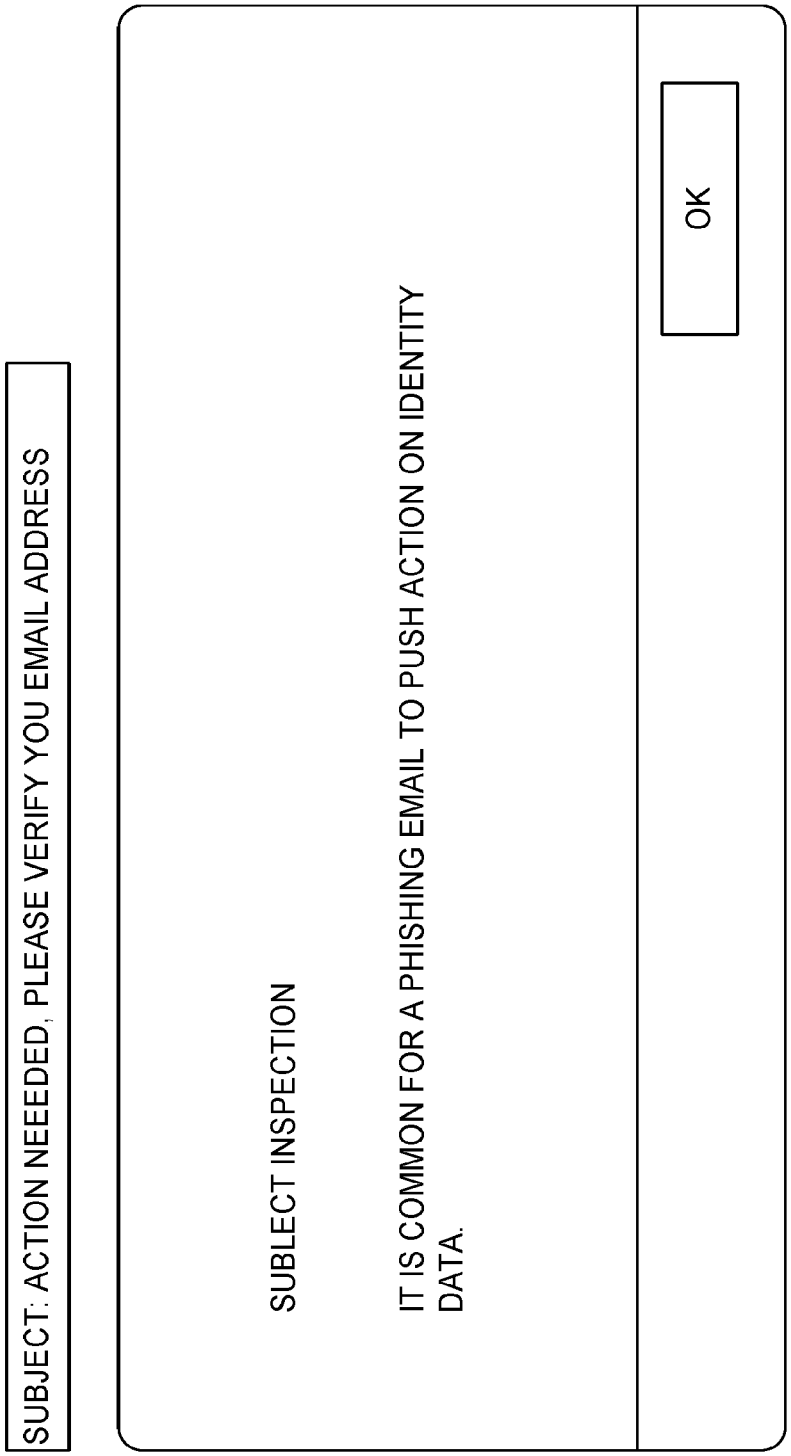
FIG. 6 is a diagram showing a subject line inspection report, according to an aspect of the technology described herein.

FIG. 6 shows a subject line inspection report 600, such as might be generated by the subject-line analysis component 136. The subject line inspection report 600 shows that the request to verify your email address is commonly found in spam emails.

FIG. 7 shows an email content report 700, such as might be generated by the body-text analysis component 138. The email content report 700 mentions that the content includes a fake security tip 712. The content report 700 also indicates that the mail is from a trusted sender 714. A hidden text explanations 716 explains that hidden text was found and is now shown in orange. In impersonation report 718 indicates that the body email impersonates Office 365. Finally, a note 720 explains that the email impersonates the brand Microsoft but is not from Microsoft.

FIG. 8 is an example of a message 800 with hidden text exposed. The message includes a typical header 812 and body text 816. As can be seen, the body 816 includes text with a series of question marks in diamond-shaped boxes between words and letters. These question marks represent a previously hidden trait that is exposed by the technology described herein. Exposing the hidden text makes it easy to determine that this is a spam email.

Figure 9:
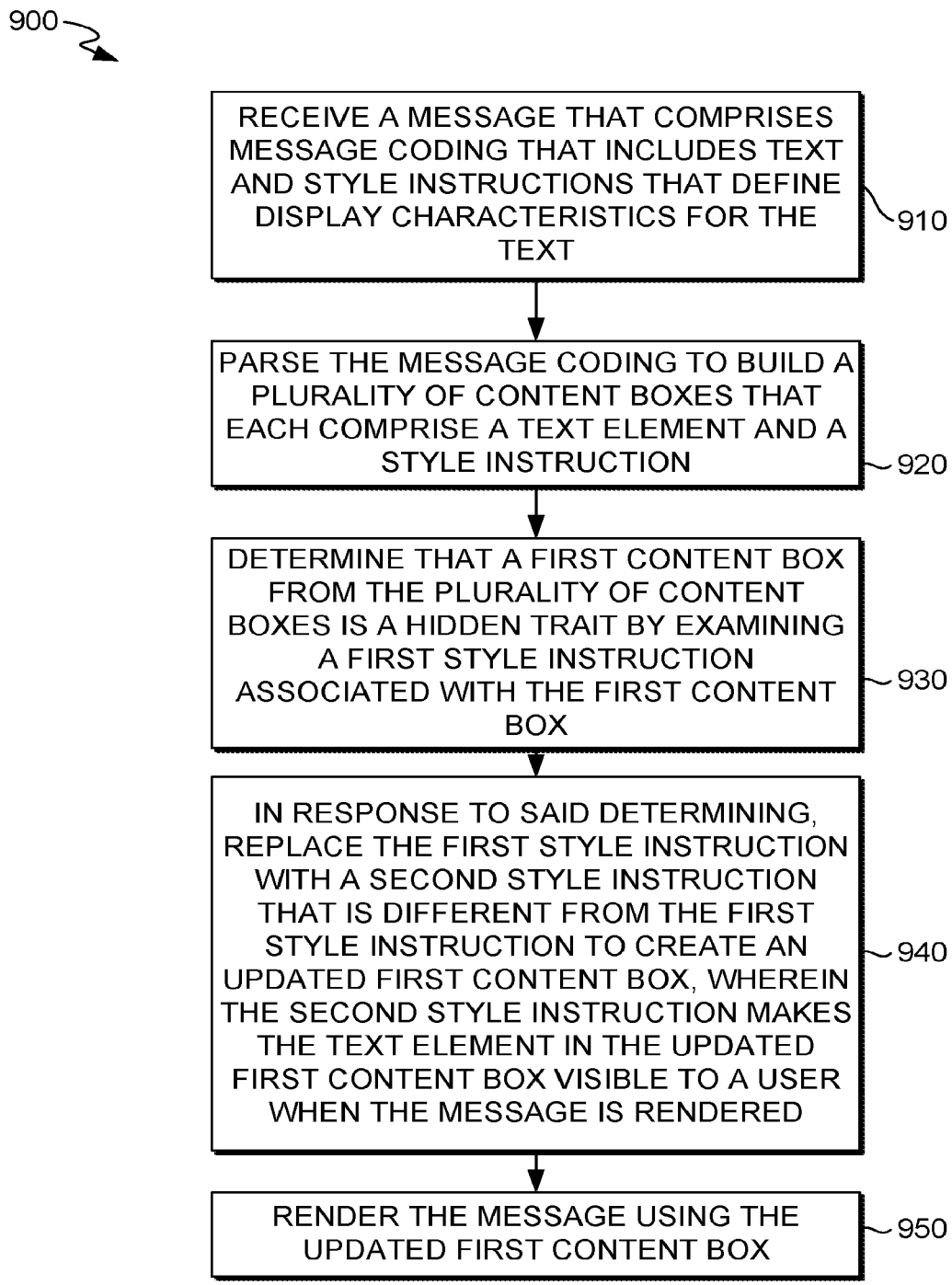
FIGS. 9-11 depict flow diagrams of methods for displaying hidden message traits, in accordance with an aspect of the technology.

Turning now to FIG. 9, a method 900 for displaying hidden message traits of an electronic message is described. Method 900 may be performed by hidden-trait exposure system 115 and produce results illustrated in FIGS. 3-8.

At step 910, a message is received that comprises message coding that includes text and style instructions that define display characteristics for the text. For example, the message may be an email in HTML format. However, implementations of the technology described herein are not limited to email or email in HTML format.

At step 920, the message coding is parsed to build a plurality of content boxes that each comprise a text element and a style instruction. Message parsing has been described previously with reference to, at least, the presentation parser 120.

At step 930, a first content box from the plurality of content boxes is determined to be a hidden trait by examining a first style instruction associated with the first content box. The hidden trait may be hidden text. Hidden text is text that is not visible to the user when the message is output for display to the user. Text can be hidden in a number of different ways. For example, text may be associated with a small or zero size font, the text color may match or be similar to the background color, the text may be occluded by an image, and the like. A similar color between the background and text may be determined by determining the color distance and comparing the color distance to a threshold. Similarly, a small font size maybe any font less than the designated threshold size.

At step 940, in response to the determination of step 930, the first style instruction is replaced with a second style instruction that is different from the first style instruction to create an updated first content box. The second style instruction makes the text element in the updated first content box visible to a user when the message is rendered.

Once hidden text is identified, a display characteristic of the text that renders it hidden is changed to make the text visible. For example, the font size may be increased to a size similar to that of other text in the message. While the text size may match the size of nearby text, additional characteristics of the hidden text may be changed to indicate that it has been modified. For example, the transformed text may be displayed with a strikethrough, in a different color, in italics, in bold, highlighted with a different background color, or otherwise differentiated from other text that was not transformed.

The text may be transformed by associating the hidden text with a different style instruction. Style instructions can come in many forms. For example, style instructions for text can be provided by HTML attributes, CSS styles, and other means. The text may be transformed by replacing an original style instruction with a new style instruction that renders a text visible.

At step 950, the message is rendered using the updated first content box.

Figure 10:
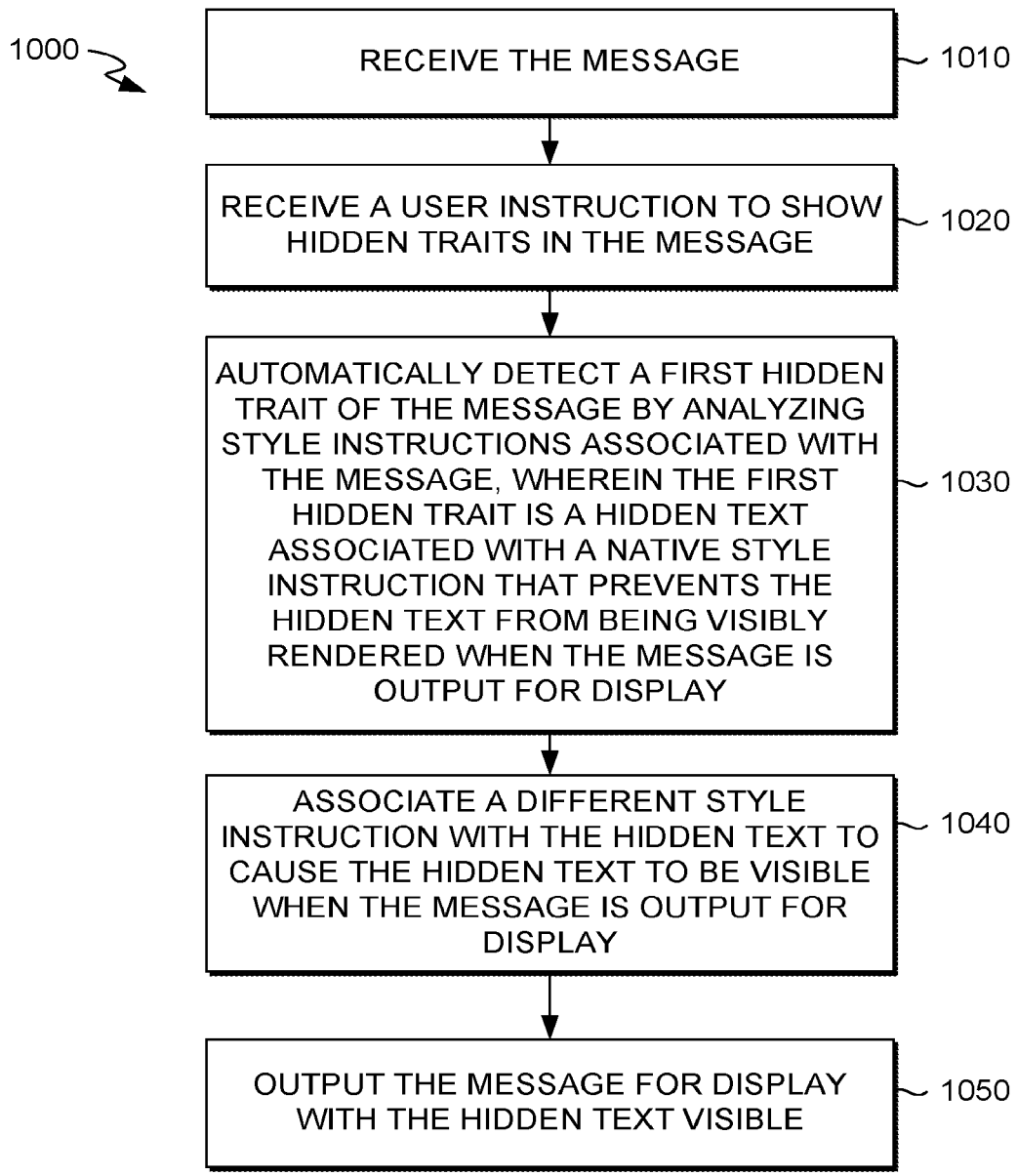

Turning now to FIG. 10, a method 1000 for displaying hidden message traits of an electronic message is described. Method 1000 may be performed by hidden-trait exposure system 115 and produce results illustrated in FIGS. 3-8.

At step 1010, the message is received. For example, the message may be an email in HTML format. However, implementations of the technology described herein are not limited to email or email in HTML format.

At step 1020, a user instruction to show hidden traits in the message. The user instruction can be for a portion of the message, such as the body text, header, or subject line. Alternatively, the user instruction could be for the entire message. Whether for a portion or the entire message, the user instruction could be for a particular hidden trait or for any hidden trait. For example, the user could only be interested in hidden text and images.

At step 1030, a first hidden trait of the message is automatically detected by analyzing style instructions associated with the message. The first hidden trait is a hidden text associated with a native style instruction that prevents the hidden text from being visibly rendered when the message is output for display. Hidden text is text that is not visible to the user when the message is output for display to the user. Text can be hidden in a number of different ways. For example, text may be associated with a small or zero size font, the text color may match or be similar to the background color, the text may be occluded by an image, and the like. A similar color between the background and text may be determined by determining the color distance and comparing the color distance to a threshold. Similarly, a small font size maybe any font less than the designated threshold size.

At step 1040, a different style instruction is associated with the hidden text to cause the hidden text to be visible when the message is output for display. Once hidden text is identified, a display characteristic of the text that renders it hidden is changed to make the text visible. For example, the font size may be increased to a size similar to that of other text in the message. While the text size may match the size of nearby text, additional characteristics of the hidden text may be changed to indicate that it has been modified. For example, the transformed text may be displayed with a strikethrough, in a different color, in italics, in bold, highlighted with a different background color, or otherwise differentiated from other text that was not transformed.

The text may be transformed by associating the hidden text with a different style instruction. Style instructions can come in many forms. For example, style instructions for text can be provided by HTML attributes, CSS styles, and other means. The text may be transformed by replacing an original style instruction with a new style instruction that renders a text visible.

At step 1050, the message is output for display with the hidden text visible.

Figure 11:
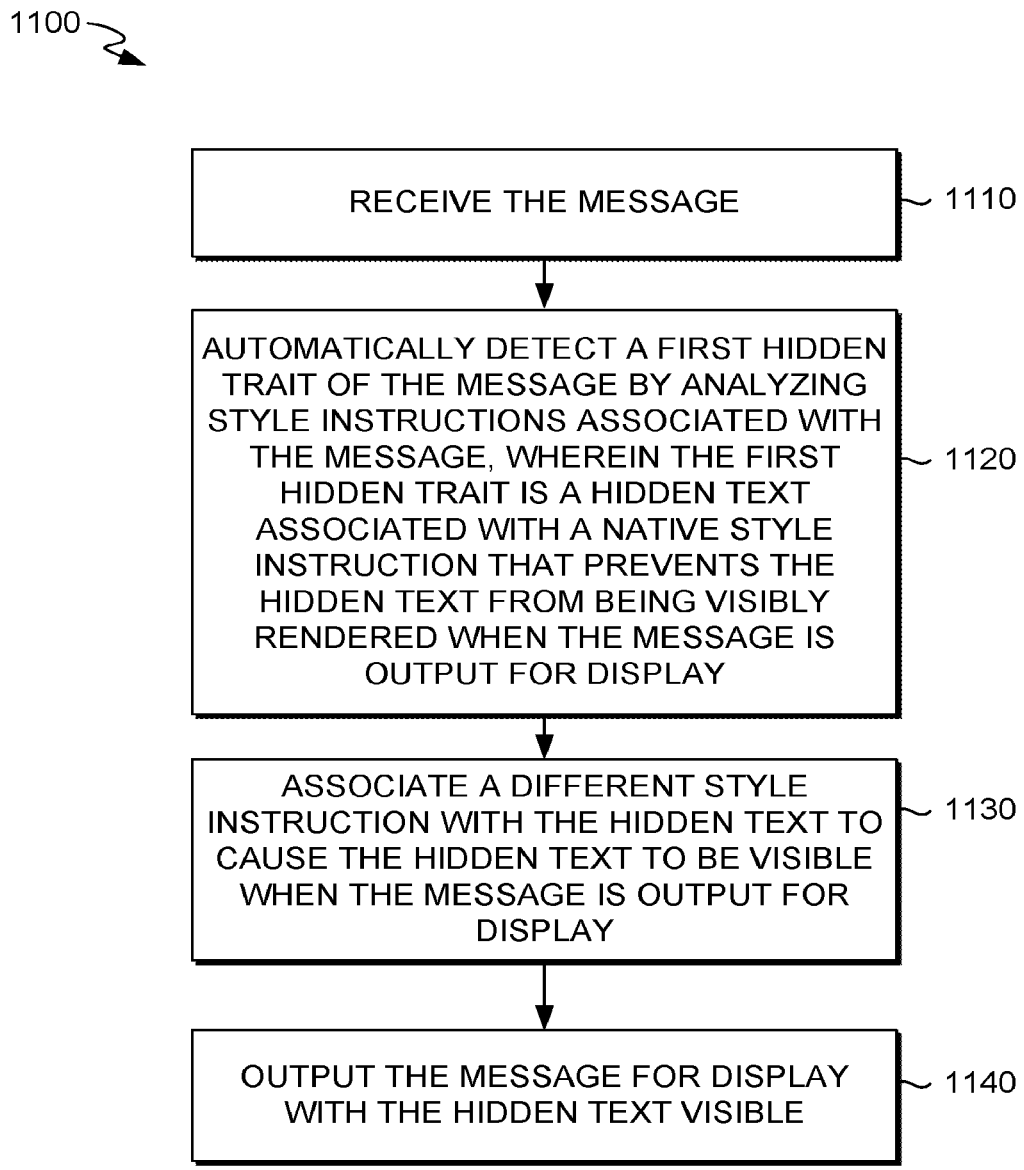

Turning now to FIG. 11, a method 1100 for displaying hidden message traits of an electronic message is described. Method 1100 may be performed by hidden-trait exposure system 115 and produce results illustrated in FIGS. 3-8.

At step 1010, the electronic message is received. For example, the message may be an email in HTML format. However, implementations of the technology described herein are not limited to email or email in HTML format.

At step 1020, a first hidden trait of the message is automatically detected by analyzing style instructions associated with the electronic message. The first hidden trait is a hidden text associated with a native style instruction that prevents the hidden text from being visibly rendered when the message is output for display. Hidden text is text that is not visible to the user when the message is output for display to the user. Text can be hidden in a number of different ways. For example, text may be associated with a small or zero size font, the text color may match or be similar to the background color, the text may be occluded by an image, and the like. A similar color between the background and text may be determined by determining the color distance and comparing the color distance to a threshold. Similarly, a small font size maybe any font less than the designated threshold size.

At step 1030, a different style instruction is associated with the hidden text to cause the hidden text to be visible when the message is output for display. Once hidden text is identified, a display characteristic of the text that renders it hidden is changed to make the text visible. For example, the font size may be increased to a size similar to that of other text in the message. While the text size may match the size of nearby text, additional characteristics of the hidden text may be changed to indicate that it has been modified. For example, the transformed text may be displayed with a strikethrough, in a different color, in italics, in bold, highlighted with a different background color, or otherwise differentiated from other text that was not transformed.

The text may be transformed by associating the hidden text with a different style instruction. Style instructions can come in many forms. For example, style instructions for text can be provided by HTML attributes, CSS styles, and other means. The text may be transformed by replacing an original style instruction with a new style instruction that renders a text visible.

Figure 12:
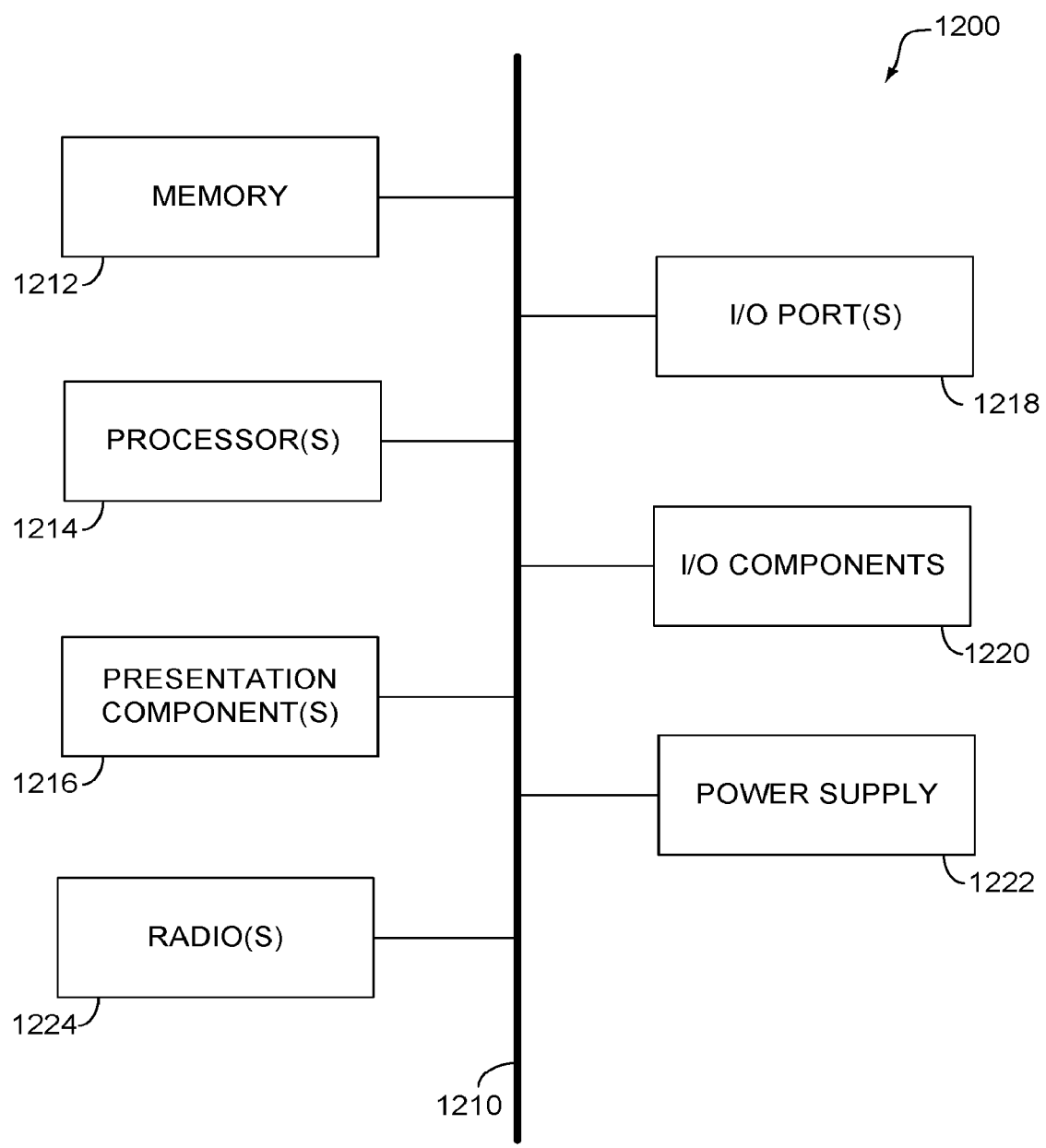
FIG. 12 is a block diagram of an exemplary computing environment suitable for use in implementing an aspect of the technology.

At step 1040, the message is output for display with the hidden text visible With reference to FIG. 12, computing device 1200 includes a bus 1210 that directly or indirectly couples the following devices: memory 1212, one or more processors 1214, one or more presentation components 1216, one or more input/output (I/O) ports 1218, one or more I/O components 1220, and an illustrative power supply 1222. Bus 1210 represents what may be one or more busses (such as an address bus, data bus, or combination thereof). Although the various blocks of FIG. 12 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 12 is merely illustrative of an exemplary computing device that can be used in connection with one or more aspects of the present technology. Distinction is not made between such categories as "workstation," "server," "laptop," "handheld device," etc., as all are contemplated within the scope of FIG. 12 and with reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1212 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors 1214 that read data from various entities such as memory 1212 or I/O components 1220. Presentation component(s) 1216 presents data indications to a user or other device. Exemplary presentation components include a display device, speaker, printing component, vibrating component, and the like.

The I/O ports 1218 allow computing device 1200 to be logically coupled to other devices, including I/O components 1220, some of which may be built in. Illustrative components include a microphone, joystick, game pad, satellite dish, scanner, printer, wireless device, etc.

The I/O components 1220 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1200. The computing device 1200 may be equipped with depth cameras, such as stereoscopic camera systems, infrared camera systems, RGB camera systems, and combinations of these, for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

Some aspects of computing device 1200 may include one or more radio(s) 1224 (or similar wireless communication components). The radio 1224 transmits and receives radio or wireless communications. The computing device 1200 may be a wireless terminal adapted to receive communications and media over various wireless networks. Computing device 1200 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method for displaying hidden message traits of an electronic message, comprising:
   receiving a message that comprises message coding that includes text and style instructions that define display characteristics for the text;
   parsing the message coding to build a plurality of content boxes that each comprise a text element and a style instruction;
   determining that a first content box from the plurality of content boxes is a hidden trait by examining a first style instruction associated with the first content box;
   in response to said determining, replacing the first style instruction with a second style instruction that is different from the first style instruction to create an updated first content box, wherein the second style instruction makes the text element in the updated first content box visible to a user when the message is rendered; and
   rendering the message using the updated first content box.

2. The method of claim 1, wherein said determining that the first content box is a hidden trait comprises comparing the first style instruction to a plurality of rules that define hidden content.

3. The method of claim 2, wherein one of the plurality of rules is a font size in the first style instruction being less than a threshold size.

4. The method of claim 2, wherein one of the plurality of rules is a text color in the first style instruction being within a threshold similarity to a background color for the first content box.

5. The method of claim 1, wherein the second style instruction is selected to assign a font size to the text element in the first content box that is also assigned to different text elements in one or more content boxes located adjacent to the first content box.

6. The method of claim 5, wherein the second style instruction comprises a font color that is different from a second font color specified by different style instructions associated with adjacent context boxes.

7. The method of claim 1, wherein the message also comprises an image and the method further comprises determining that the image depicts text, and as a result of determining that the image depicts text, adding a visible boarder around the image to show the user that the image is present in the message.

8. A method for displaying hidden message traits of an electronic message, comprising:
   receiving the message;
   receiving a user instruction to show hidden traits in the message;
   automatically detecting a first hidden trait of the message by analyzing style instructions associated with the message, wherein the first hidden trait is a hidden text associated with a native style instruction that prevents the hidden text from being visibly rendered when the message is output for display;
   associating a different style instruction with the hidden text to cause the hidden text to be visible when the message is output for display; and
   outputting the message for display with the hidden text visible.

9. The method of claim 8, wherein the different display style causes the hidden text to be rendered with a strike through line.

10. The method of claim 8, further comprising performing an impersonation evaluation on the message and outputting an impersonation report describing any evidence of impersonation detected in the message.

11. The method of claim 8, further comprising performing a link evaluation on the message and outputting a link report describing a deceptive feature associated with the link.

12. The method of claim 8, further comprising performing a header analysis on a header of the message and outputting a header report describing suspicious scripts detected in the header.

13. The method of claim 8, further comprising:
   parsing message coding associated with the message to build a plurality of content boxes that each comprise text and a style instruction;
   determining that a first content box from the plurality of content boxes is hidden by examining the style instruction associated with the first content box, wherein the first content box is associated with the hidden text; and
   associating the different style instruction with the first content box.

14. The method of claim 8, further comprising performing an analysis on the subject line of the message and outputting a subject line report describing a similarity between content in the subject line and subject line content from messages previously classified as spam.

15. The method of claim 8, wherein the different display style causes the hidden text to be rendered in a first color that is different from a second color assigned to text that was not determined to be hidden content.

16. One or more computer storage media that, when executed by a computing device, causes the computing device to perform a method of displaying hidden traits in an electronic message, the method comprising:
   receiving the electronic message;
   automatically detecting a first hidden trait of the message by analyzing style instructions associated with the electronic message, wherein the first hidden trait is a hidden text associated with a native style instruction that prevents the hidden text from being visibly rendered when the message is output for display;
   associating a different style instruction with the hidden text to cause the hidden text to be visible when the message is output for display; and
   outputting the message for display with the hidden text visible.

17. The media of claim 13, further comprising:
   parsing message coding associated with the message to build a plurality of content boxes that each comprise text and a style instruction;
   determining that a first content box from the plurality of content boxes is hidden by examining the style instruction associated with the first content box, wherein the first content box is associated with the hidden text; and
   associating the different style instruction with the first content box.

18. The media of claim 13, wherein the different display style causes the hidden text to be rendered in a first color that is different from a second color assigned to text that was not determined to be hidden content.

19. The media of claim 13, further comprising performing a header analysis on a header of the message and outputting a header report describing a geolocation associated with a client IP address of a sender device.

20. The media of claim 13, wherein the header report also describes a reputation of the geolocation and a reputation of the IP address.

* * * * *